United States Patent
Kritt et al.

(10) Patent No.: US 9,696,798 B2
(45) Date of Patent: Jul. 4, 2017

(54) EYE GAZE DIRECTION INDICATOR

(71) Applicant: LENOVO ENTERPRISE SOLUTIONS (SINGAPORE) PTE, LTD., New Tech Park (SG)

(72) Inventors: Barry A Kritt, Atlantic Beach, NC (US); Sarbajit K. Rakshit, Kolkata (IN)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/248,681

(22) Filed: Apr. 9, 2014

(65) Prior Publication Data
US 2015/0293586 A1 Oct. 15, 2015

(51) Int. Cl.
*G06F 3/01* (2006.01)
*G06T 11/60* (2006.01)

(52) U.S. Cl.
CPC .............. *G06F 3/013* (2013.01); *G06T 11/60* (2013.01)

(58) Field of Classification Search
CPC ........ G06F 3/0346; G06F 3/013; G06F 3/011; G06F 3/012; G06F 3/0482; G06F 3/017; G02B 27/017; G02B 2027/014; G02B 2027/0178; G02B 27/01; G02B 27/0172; G06T 19/006
USPC ......................................... 345/158, 7, 8, 633
See application file for complete search history.

(56) References Cited

U.S. PATENT DOCUMENTS

| | | | |
|---|---|---|---|
| 6,603,491 B2 | 8/2003 | Lemelson et al. | |
| 2009/0040308 A1* | 2/2009 | Temovskiy | F41G 3/16 348/158 |
| 2010/0165093 A1 | 7/2010 | Sugio et al. | |
| 2011/0214082 A1* | 9/2011 | Osterhout | G02B 27/017 715/773 |
| 2012/0206333 A1* | 8/2012 | Kim | G06F 3/013 345/156 |
| 2013/0055143 A1* | 2/2013 | Martin | G06F 3/0425 715/779 |

(Continued)

OTHER PUBLICATIONS

Anonymous, "SMI 3D Eye Tracking Package," SMI Eye Tracking Glasses, mobile eye tracking glasses by Senso Motoric, http://www.eyetracking-glasses.com/products/3d-eye-tracking-glasses/te . . . (last accessed Dec. 2, 2013).

(Continued)

*Primary Examiner* — Koosha Sharifi-Tafreshi
(74) *Attorney, Agent, or Firm* — Jason Friday

(57) ABSTRACT

A user of a computing system gazes at an image of visible objects in the user's field of view. The computing system determines the direction of the user's eye gaze into the field of view, and augments the image seen by the user with a computer-generated gaze direction indicator. The computing system may also determine the direction of an auxiliary pointer into the field of view, and may further augment the image seen by the user with a computer-generated auxiliary pointer direction indicator. The gaze direction indicator may be adjusted based on the user's eye movement and the auxiliary pointer direction indicator may be adjusted based on manipulation of the auxiliary pointer. The direction indicators may intersect over an object in the user's field of view, and may be displayed on a transparent display screen positioned between the user and the object.

17 Claims, 3 Drawing Sheets

(56) References Cited

U.S. PATENT DOCUMENTS

| | | |
|---|---|---|
| 2013/0154913 A1 | 6/2013 | Genc et al. |
| 2013/0222638 A1 | 8/2013 | Wheeler et al. |
| 2014/0267400 A1* | 9/2014 | Mabbutt ............... G06T 19/006 345/633 |
| 2015/0261318 A1* | 9/2015 | Scavezze .............. G06F 3/0346 345/158 |
| 2016/0139762 A1* | 5/2016 | Meir ....................... G06F 3/005 345/156 |
| 2017/0068322 A1* | 3/2017 | Steinberg ................ G06F 3/005 |

OTHER PUBLICATIONS

Arthur, Charles, "UK company's 'augmented reality' glasses could be better than Google's: Google's Glass project may face some stiff competition, after TTP develops a 'heads-up' prototype," http://www.theguardian.com/technology/2012/sep/10/augmented-reality- . . . , © 2013 Guardian News and Media Limited or its affiliated companies, (last modified Sep. 10, 2012, last accessed Dec. 2, 2013).

Harris, Shea, "Google patent details indicate Google Glass(es) may use hand gestures," http://www.androidauthority.com/google-glass-glasses-hand-gestures-pat . . . , © 2013 AndroidAuthority.com (last modified May 19, 2012, 1:17 am, last accessed Dec. 2, 2013).

Phandroid, "Looking through Google Glass: Real Life Example," www.youtube.com, full review—http://phandroid.com/2013/05/09/googl . . . (created May 8, 2013; last accessed Dec. 2, 2013).

Rainmaker, "Recon Instruments previews cycling heads-up display," http://www.dcrainmaker.com/2013/03/recon-cycling-display.html, © 2013 DC Rainmaker (last modified Mar. 6, 2013, last accessed Dec. 2, 2013).

\* cited by examiner

EYE GAZE DIRECTION INDICATOR

BACKGROUND

The present disclosure relates to augmented reality computing systems, and more specifically relates to inserting an eye gaze direction indicator into a field of view of a user of an augmented reality computing system.

Augmented reality technology provides for the incorporation of artificial information into a user's perception of a real-world environment. Augmented reality computing systems may include computer processors in communication with cameras, projectors, display screens, and other input/output devices; in communication with mobile devices such as tablets and smart phones; and also in communication with databases and other information sources. Information sources may be accessed, for example, through networks such as the Internet.

SUMMARY

Disclosed herein are embodiments of a method for augmenting an image seen by a user of a computing system. The image includes objects that are visible in the user's field of view. The computing system may determine the eye gaze direction of the user into the field of view. The computing system may then insert a computer-generated gaze direction indicator into the image visible to the user. The computer-generated gaze direction indicator represents the eye gaze direction of the user into the field of view. In some embodiments, the computer-generated gaze direction indicator is displayed on a transparent display screen positioned between the user and the visible objects in the user's field of view. The computer-generated gaze direction indicator may be adjusted based on the user's eye movement.

The computing system may also determine the direction of an auxiliary pointer into the user's field of view. The point of origin of the auxiliary pointer direction may be offset from the point of origin of the eye gaze direction. The computing system may then insert a computer-generated auxiliary pointer direction indicator into the image visible to the user. The computer-generated auxiliary pointer direction indicator represents the auxiliary pointer direction into the user's field of view. The computer-generated auxiliary pointer direction indicator may intersect the computer-generated gaze direction indicator over an object in the image visible to the user. The computer-generated auxiliary pointer direction indicator may be adjusted based on manipulation of the auxiliary pointer. Also disclosed herein are embodiments of a computer program product providing program instructions executable by the computing system to perform the described method.

Disclosed herein are also embodiments of a computing system for augmenting an image of objects visible to a user in a field of view. The system may include a gaze capture unit, a gaze direction determination unit, a gaze direction indicator generator, an auxiliary pointer capture unit, an auxiliary pointer direction determination unit, and an auxiliary pointer direction indicator generator. The gaze direction determination unit may be configured to receive gaze capture data from the gaze capture unit. The gaze direction determination unit may be further configured to use the gaze capture data to determine the eye gaze direction of the user into the user's field of view. The gaze direction indicator generator may be configured to insert a gaze direction indicator into image visible to the user.

The auxiliary pointer capture unit is associated with an auxiliary pointer. The auxiliary pointer direction determination unit may be configured to receive auxiliary pointer capture data from the auxiliary pointer capture unit. The auxiliary pointer direction determination unit may be further configured to use the auxiliary pointer capture data to determine the auxiliary pointer direction of the auxiliary pointer into the user's field of view. The auxiliary pointer direction indicator generator may be configured to insert an auxiliary pointer direction indicator into the image visible to the user. The auxiliary pointer direction indicator and the gaze direction indicator may intersect over an object in the image visible to the user. In some embodiments, the gaze direction indicator and the auxiliary pointer direction indicator are displayed on a transparent display screen positioned between the user and the visible objects in the user's field of view. The direction indicators may be adjusted based on the user's eye movement and manipulation of the auxiliary pointer.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
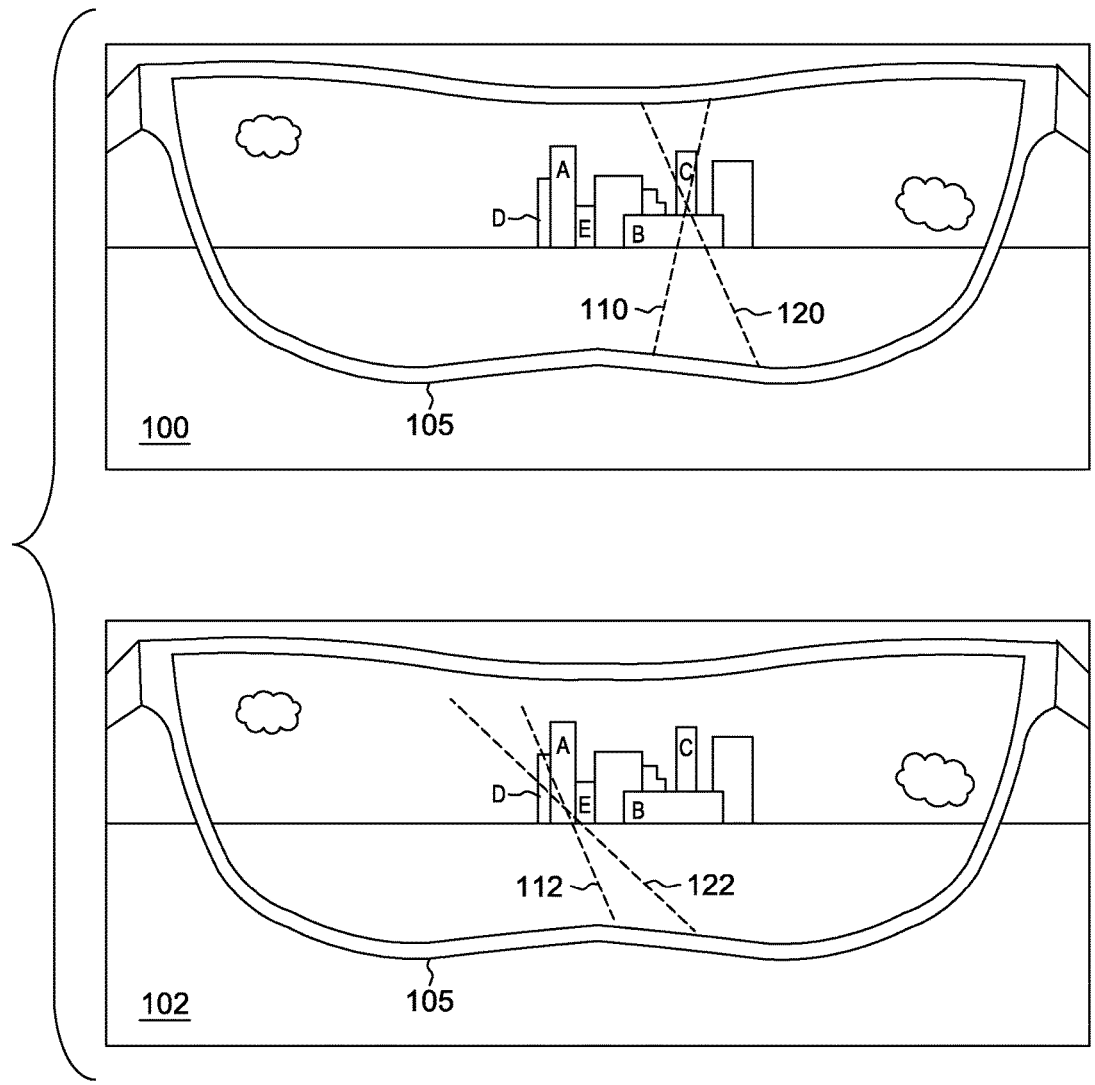
FIG. 1 depicts an example image of objects visible in a field of view of a user of an example computing system, the image augmented with a computer-generated gaze direction indicator and a computer-generated auxiliary pointer direction indicator.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to inserting an eye gaze direction indicator into an image of objects visible in a field of view to a user of an augmented reality computing system. More particular aspects relate to also inserting an auxiliary pointer direction indicator into the image, and adjusting the eye gaze direction indicator and the auxiliary pointer direction indicator such that a particular object in the field of view is positioned at the intersection of the two direction indicators. While the present disclosure is not necessarily limited to such applications, various aspects of the disclosure may be appreciated through a discussion of various examples using this context.

Augmented reality computing systems may include processors and memory devices, as well as sensors, cameras, and other input devices. Augmented reality computing systems may also include displays and other output devices, such as optical head-mounted displays, that can display artificial images to the user as well as allow the user to see through the display into a field of view. When viewing a real-life scene through such a display, the augmented reality technology may also be capturing the scene. A user may wish to select a particular object in the scene for processing by the augmented reality technology. For example, the user may wish to zoom in on the object or to find out more information about the object. When objects in the scene are large or when the scene is sparsely populated, it may be possible for a user to select an object merely by gazing at it. But when objects are small or the scene is densely populated, such as when the objects of interest are close together and at a great distance from the user, it may be difficult for an eye-gaze detector in the computing system to differentiate between the objects. A solution to this problem is to augment the scene as viewed by the user with user-controlled direction indicators for identifying objects of interest.

FIG. 1 illustrates an example augmented field of view 100 of a user of an example augmented reality computing system. The augmented reality computing system includes a transparent display screen 105. Through the transparent display screen 105, the user can see the buildings of a city in the distance within the field of view 100. The computing system may use input hardware, not shown, such as a camera focused on the user's pupils and retina and/or sensors monitoring the user's temporal muscle activity, together with one or more processors, to determine what the user is looking at within the field of view. But if the user is looking in the direction of Building C in the viewed city, it may be impossible for the computing system to determine whether the user is interested in Building C or Building B, since both buildings fall in the line of sight of the user.

To aid the user in specifying a particular object in the field of view 100, the computing system may augment the image seen by the user with a gaze direction indicator 110. The gaze direction indicator 110 is a representation of the user's eye gaze direction that is displayed on the transparent display screen 105, thus inserting the gaze direction indicator 110 into the user's field of view 100. The computer-generated gaze direction indicator 110 may take any form, and may be, for example, a line through the field of view 100. The line may be black, white, or any color; may be solid, dotted, or dashed; may be opaque, transparent, or translucent; or may be in any other configuration sufficient to give the user an indication of the user's eye gaze direction.

The computing system may also augment the image seen by the user with an auxiliary pointer direction indicator 120. Rather than eye gaze, the source of the auxiliary pointer direction indicator 120 is an auxiliary pointer into the field of view. In some embodiments, the auxiliary pointer may actually enter the field of view, such as the user's finger or an object in the user's hand, and the auxiliary pointer direction may be extrapolated from the image of the auxiliary pointer. In some embodiments, the auxiliary pointer may be a compass-enabled mobile device or other navigational instrument in communication with the computing system, and the auxiliary pointer direction may be extrapolated from the data provided by the auxiliary pointer. The auxiliary pointer direction indicator 120 is a representation of the auxiliary pointer direction of the auxiliary pointer that is displayed on the transparent display screen 105, thus inserting the auxiliary pointer direction indicator 120 into the user's field of view 100. Like the computer-generated gaze direction indicator 110, the computer-generated auxiliary pointer direction indicator 120 may take any form sufficient to give the user an indication of the auxiliary pointer direction. Furthermore, the auxiliary pointer direction indicator 120 and the gaze direction indicator 110 may be displayed in different forms as an aid for the user in distinguishing the two indicators. For example, the indicators may be different colors or different thicknesses.

In the field of view 100, the computer-generated gaze direction indicator 110 intersects the computer-generated auxiliary pointer direction indicator 120 over Building C, providing the user with the ability to distinguish between Building C and Building B, which are both in the user's line of sight. To reposition the intersection of gaze direction indicator 110 and auxiliary pointer direction indicator 120, the user need only redirect his gaze, reposition his auxiliary pointer, or both. This is shown in the other field of view 102 in FIG. 1.

Field of view 102 is identical to field of view 100, except that the computer-generated direction indicators have been repositioned. When the user moves his eyes to redirect his gaze toward Building A, the computing system's gaze direction detector recalculates the gaze direction and the computing system adjusts the displayed gaze direction indicator 112 so that it represents the user's new gaze direction in the field of view 102. But since Building D also falls in the adjusted line of sight of the user, the user may also reposition the auxiliary pointer toward Building A. In response, the computing system auxiliary pointer direction detector recalculates the auxiliary pointer direction and the computing system adjusts the displayed auxiliary pointer direction indicator 122 so that it represents the new auxiliary pointer direction in the field of view 102. Using the auxiliary pointer direction indicator 122, the user may precisely adjust the direction of the auxiliary pointer such that the intersection of the two direction indicators is over Building A in the field of view.

Although the display screen 105 is depicted in FIG. 1 in the shape of eyeglass lenses, the display screen 105 may take other forms. For example, the display screen may be integrated into the visor of a helmet, may be integrated into the windshield of an automobile, may be integrated into the window of a building structure, may be embedded in contact lenses, may be a virtual retinal display, may be a see-through display of a handheld device, or may be in any other configuration.

Although the auxiliary pointer direction indicators 120, 122 are depicted in FIG. 1 as lines through the field of view, the auxiliary pointer direction indicators may take other forms. For example, the auxiliary pointer direction indicator may be a dot pointer that coincides with the eye gaze direction indicator over a particular object in the field of view, or may be in some other configuration.

Figure 2:
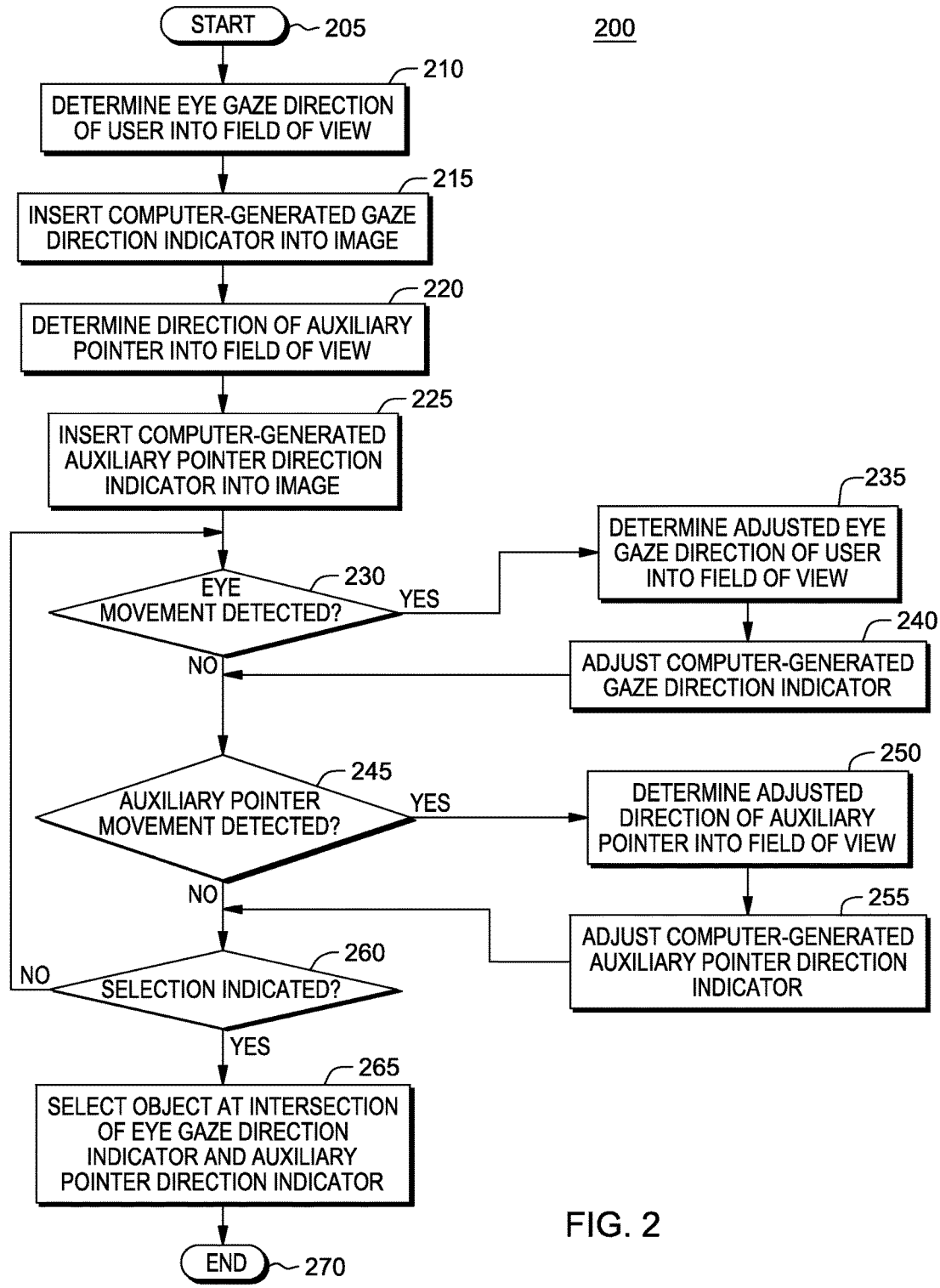
FIG. 2 is a flow diagram illustrating an example method for selecting an object visible in a computing system user's field of view using a computer-generated gaze direction indicator and a computer-generated auxiliary pointer direction indicator.

FIG. 2 illustrates an example method 200 for selecting an object visible in a computing system user's field of view using a computer-generated gaze direction indicator and a computer-generated auxiliary pointer direction indicator. From start 205, the computing system may determine the eye gaze direction of the user into the field of view at 210. The computing system may use any eye tracking system suitable for measuring the point of gaze of the user. For example, data from a camera directed at one or both eyes of the user may be used to determine a vector between the eye pupil center and corneal reflections, and the vector may be used to compute the user's eye gaze direction. After the eye gaze direction is determined, the computing system may then insert a representation of the eye gaze direction into the image as seen by the user at 215. At this point, the user may see the real objects visible in the user's field of view, such as the sky and landscape, and the user may also see the computer-generated gaze direction indicator. The computer-generated gaze direction indicator may be, for example, a line extending into the user's field of view.

To insert the computer-generated gaze direction indicator into the image visible to the user, the computing system may, for example, extrapolate the eye gaze direction and plot the extrapolated line on a transparent display screen positioned between the user and the field of view. In some embodiments, a projector may project the gaze direction indicator onto a display screen for reflection into the user's eye. A user looking through the transparent display screen may see the real objects in the field of view, as well as the computer-generated gaze direction indicator. In some embodiments, the transparent display screen is close to the user's eyes and only the user is looking at the display screen. In some embodiments, the display screen may be far enough from the user to allow others to look at it simultaneously with the user. In such embodiments, the others may or may not see the computer-generated gaze direction indicator, or may see a gaze direction indicator based on their own gaze direction, depending on the particular configuration of the computing system.

The computing system may then determine the direction of an auxiliary pointer pointing into the field of view at 220. The position of the auxiliary pointer may be controlled by the user or by some other entity. In some embodiments, the auxiliary pointer may be an object that enters the user's field of view, such as the user's finger. In such embodiments, a camera or other device capturing the user's field of view may recognize the auxiliary pointer, extrapolate the direction of the auxiliary pointer, and plot or project the extrapolated line into the user's field of view at 225. In some embodiments, the auxiliary pointer may be a compass-enabled mobile device or other navigational instrument in communication with the computing system, and may provide data derived, for example, from magnetic field sensors. In such embodiments, the auxiliary pointer direction may be extrapolated from the data provided by the auxiliary pointer, and then plotted or projected into the user's field of view at 225.

At this point, the user may see the real objects visible in the user's field of view, such as the sky and landscape, and the user may also see the computer-generated gaze direction indicator and the computer-generated auxiliary pointer direction indicator. The computer-generated direction indicators may be, for example, lines superimposed on the image of the real objects in the user's field of view. If the user then adjusts his gaze, the gaze direction determination unit of the computing system may detect the eye movement at 230. The computing system may then determine the adjusted eye gaze direction of the user into the field of view at 235, using techniques similar to those used to determine eye gaze direction at 210. The computing system may then adjust the orientation of the computer-generated gaze direction indicator to represent the new eye gaze direction of the user at 240.

If the user or other controlling entity adjusts the auxiliary pointer's position, the auxiliary pointer direction determination unit of the computing system may detect the auxiliary pointer movement at 245. The computing system may then determine the adjusted direction of the auxiliary pointer into the field of view at 250, using techniques similar to those used to determine auxiliary pointer direction at 220. The computing system may then adjust the orientation of the computer-generated auxiliary pointer direction indicator to represent the new direction of the auxiliary pointer at 255.

As just described, eye movement and auxiliary pointer movement may affect the orientations of the computer-generated gaze direction indicator and the computer-generated auxiliary pointer direction indicator in the user's field of view. To select an object in the field of view, the user may orient the two direction indicators such that the intersection of the two direction indicators is positioned over the desired object. A user may indicate a selection in any number of ways, for example by allowing the intersection to linger over the desired object for a predefined period of time, by a predefined blinking sequence, by a predefined gesture, or by any other predefined activity interpreted by the computing system as a selection. If selection is indicated at 260, then the object at the intersection of the eye gaze direction indicator and the auxiliary pointer direction indicator may be selected by the computing system at 265 and the method ends at 270. If selection is not indicated at 260, then the method returns to check for further eye movement at 230 and further auxiliary pointer movement at 245.

Once an object is determined to be selected by the user, a variety of further processing activities may be performed by the computing system, either automatically or in response to further input. The computing system may highlight the selected object in some way, may annotate the field of view with a label identifying the selected object, or may augment the image in some other way. The computing system may provide audio describing the selected object. For example, if the user selects a particular building in a city skyline, the name of the building, the height of the building, the number of floors in the building, the tenants of the building, the year the building was built, etc. may be displayed in the image or provided over a speaker connected to the computing system.

Figure 3:
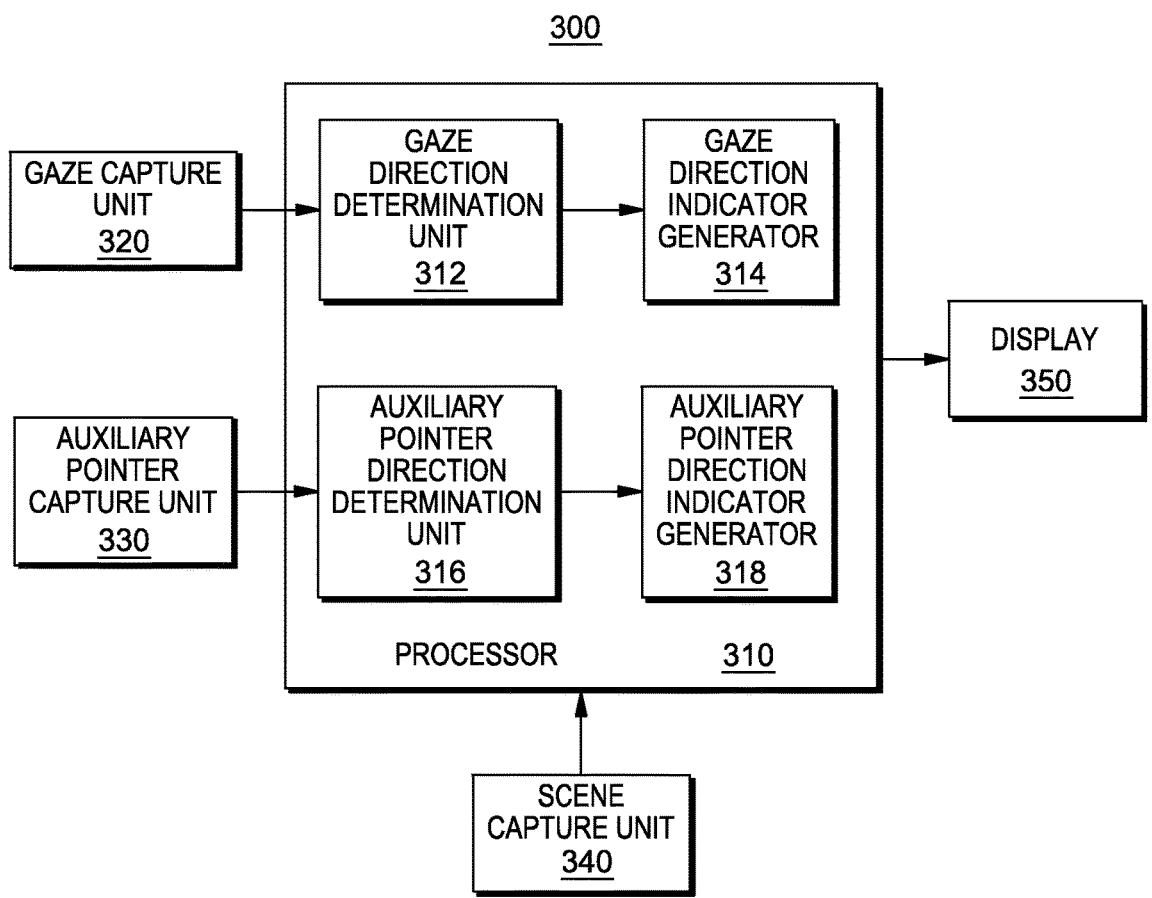
FIG. 3 is a block diagram depicting a portion of an example computing system for augmenting an image of objects visible in a user's field of view with a computer-generated gaze direction indicator and a computer-generated auxiliary pointer direction indicator.

FIG. 3 illustrates a portion of an example computing system 300 for augmenting an image of objects visible in a user's field of view with a computer-generated gaze direction indicator and a computer-generated auxiliary pointer direction indicator. The processor 310 represents one or more processors in the computing system. Multiple processors may be configured as part of a single host machine or distributed among a number of physically distinct host machines. Processors may be connected to one another and other system components through a network, either wired or wireless, that allows electronic communication between components.

A gaze capture unit 320 may provide information to the processor 310 for use in determining the eye gaze direction of the user into the field of view. The gaze capture unit 320 may be one or more cameras, one or more sensors, one or more other input devices, or a combination of input devices. The cameras may capture the position and responses of the user's eyes, such as the pupils, retinas, corneas, and other parts of the eye. The sensors may monitor the user's temporal muscle activity. The gaze capture unit may provide either raw or processed data to the processor 310.

An auxiliary pointer capture unit 330 may provide information to the processor 310 for use in determining the direction of an auxiliary pointer into the field of view. If the auxiliary pointer is an object that enters the user's field of view, such as a hand or finger of the user, then the auxiliary pointer capture unit 330 may be one or more cameras or other input devices for detecting the object, and may be combined with scene capture unit 340. If the auxiliary pointer is a compass-enabled mobile device or other navigational instrument, then the auxiliary pointer capture unit 330 may be software modules, hardware circuitry, or some combination of hardware, firmware, and software within the instrument configured to route data from the navigational sensors in the auxiliary pointer to the processor 310. The auxiliary pointer capture unit may provide either raw or processed data to the processor 310.

A scene capture unit 340 may provide information to the processor 310 for use in processing objects in the user's field of view. For example, the processor 310 may process data from the scene capture unit 340 with image recognition software to identify objects such as buildings, landmarks, faces, and other objects in the user's field of view, and may retrieve information about identified objects from various databases. The scene capture unit 340 may be, for example, one or more cameras or other input devices, and may provide either raw or processed data to the processor 310.

The processor 310 may include a gaze direction determination unit 312 and an auxiliary pointer direction determination unit 316. The gaze direction determination unit 312 may receive data from the gaze capture unit 320 and may process the data to determine the eye gaze direction of the user into the field of view. The auxiliary pointer direction determination unit 316 may receive data from the auxiliary pointer capture unit 330 and may process the data to determine the direction of the auxiliary pointer into the field of view. These units may be software modules, hardware circuitry, or some combination of hardware, firmware, and software within the processor 310.

The processor 310 may include a gaze direction indicator generator 314 and an auxiliary pointer direction indicator generator 318. The gaze direction indicator generator 314 may process data received from the gaze direction determination unit 312 and extrapolate the data to generate the gaze direction indicator and insert it into the image of the field of view visible to the user. The auxiliary pointer direction indicator generator 318 may process data received from the auxiliary pointer direction determination unit 316 and extrapolate the data to generate the auxiliary pointer direction indicator and insert it into the image of the field of view visible to the user. These generators may be software modules, hardware circuitry, or some combination of hardware, firmware, and software within the processor 310 configured to augment the display 350 with the computer-generated indicators, and may interact with projectors or other output devices to augment display 350. Display 350 may be a transparent display screen, a virtual retinal display, a see-through display of a handheld device, or any other device configured to present images of real-life scenes augmented with computer-generated images.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for augmenting an image of objects visible in a field of view to a user of a computing system, the method comprising:
   determining, with the computing system, an eye gaze direction of the user into the field of view;
   inserting a computer-generated gaze direction indicator into the image visible to the user, the computer-generated gaze direction indicator a representation of the eye gaze direction of the user into the field of view;
   determining an auxiliary pointer direction of an auxiliary pointer into the field of view, a point of origin of the auxiliary pointer direction offset from a point of origin of the eye gaze direction, the auxiliary pointer being one of a pointing finger of a user and a pointing object held in a user's hand within the image;
   inserting a computer-generated auxiliary pointer direction indicator, different than the computer-generated gaze direction indicator, into the image visible to the user, the computer-generated auxiliary pointer direction indicator a representation of the auxiliary pointer direction into the field of view, the computer-generated auxiliary pointer direction indicator intersecting the computer-generated gaze direction indicator over a first object in the image visible to the user; and
   selecting the first object in the image over which the computer-generated auxiliary pointer direction indicator and the computer-generated gaze direction indicator intersect.

2. The method of claim 1, wherein the computer-generated gaze direction indicator is displayed on a transparent display screen positioned between the user and the objects.

3. The method of claim 2, wherein the transparent display screen is worn by the user.

4. The method of claim 1, further comprising:
   detecting, with the computing system, eye movement of the user;
   determining, with the computing system, an adjusted eye gaze direction of the user into the field of view, the adjusted eye gaze direction resulting from the eye movement; and
   adjusting the computer-generated gaze direction indicator, the adjusted computer-generated gaze direction indicator a representation of the adjusted eye gaze direction of the user into the field of view.

5. The method of claim 1, wherein the auxiliary pointer is a compass-enabled mobile device held by the user, and wherein the determining the auxiliary pointer direction of the auxiliary pointer into the field of view comprises receiving orientation data from the compass-enabled mobile device.

6. The method of claim 1, further comprising:
   determining an adjusted auxiliary pointer direction of the auxiliary pointer into the field of view, the adjusted auxiliary pointer direction resulting from auxiliary pointer manipulation; and
   adjusting the computer-generated auxiliary pointer direction indicator, the adjusted computer-generated auxiliary pointer direction indicator a representation of the adjusted auxiliary pointer direction of the auxiliary pointer into the field of view, the adjusted computer-generated auxiliary pointer direction indicator intersecting the computer-generated gaze direction indicator over a second object in the image visible to the user.

7. A computing system for augmenting an image of objects visible in a field of view to a user of the computing system, the system comprising:
   a gaze capture unit;
   a gaze direction determination unit configured to receive gaze capture data from the gaze capture unit, and further configured to determine an eye gaze direction of the user into the field of view using the gaze capture data;
   a gaze direction indicator generator in communication with the gaze direction determination unit, the gaze direction indicator generator configured to insert a gaze direction indicator into the image visible to the user, the gaze direction indicator a representation of the eye gaze direction of the user into the field of view;

an auxiliary pointer capture unit associated with an auxiliary pointer;

an auxiliary pointer direction determination unit configured to receive auxiliary pointer capture data from the auxiliary pointer capture unit, and further configured to determine an auxiliary pointer direction of the auxiliary pointer into the field of view using the auxiliary pointer capture data, a point of origin of the auxiliary pointer direction offset from a point of origin of the eye gaze direction, the auxiliary pointer being one of a pointing finger of a user and a pointing object held in a user's hand within the image; and an auxiliary pointer direction indicator generator in communication with the auxiliary pointer direction determination unit, the auxiliary pointer direction indicator generator configured to insert an auxiliary pointer direction indicator different than the gaze-direction unit into the image visible to the user, the auxiliary pointer direction indicator a representation of the auxiliary pointer direction into the field of view, the auxiliary pointer direction indicator intersecting the gaze direction indicator over a first object in the image visible to the user, the first object in the image over which the computer-generated auxiliary pointer direction indicator and the computer-generated gaze direction indicator intersect being correspondingly selected.

8. The system of claim 7, further comprising:
a transparent display screen positioned between the user and the objects, wherein the gaze direction indicator is displayed on the transparent display screen.

9. The system of claim 8, wherein the transparent display screen is worn by the user.

10. The system of claim 7, wherein the gaze direction determination unit is further configured to determine, in response to eye movement of the user, an adjusted eye gaze direction of the user into the field of view.

11. The system of claim 7, wherein the gaze direction indicator generator is further configured to adjust, in response to eye movement of the user, the gaze direction indicator in the image visible to the user.

12. The system of claim 7, wherein the auxiliary pointer is a compass-enabled mobile device held by the user, and wherein the auxiliary pointer capture data is orientation data from the compass-enabled mobile device.

13. The system of claim 7, wherein the auxiliary pointer direction determination unit is further configured to determine, in response to auxiliary pointer manipulation, an adjusted auxiliary pointer direction into the field of view.

14. The system of claim 7, wherein the auxiliary pointer direction indicator generator is further configured to adjust, in response to auxiliary pointer manipulation, the auxiliary pointer direction indicator in the image visible to the user.

15. A computer program product for augmenting an image of objects visible in a field of view to a user of a computing system, the computer program product comprising a computer readable storage medium having program instructions embodied therewith, the program instructions executable by the computing system to perform a method comprising:
determining, with the computing system, an eye gaze direction of the user into the field of view;
inserting a computer-generated gaze direction indicator into the image visible to the user, the computer-generated gaze direction indicator a representation of the eye gaze direction of the user into the field of view;
determining an auxiliary pointer direction of an auxiliary pointer into the field of view, a point of origin of the auxiliary pointer direction offset from a point of origin of the eye gaze direction, the auxiliary pointer being one of a pointing finger of a user and a pointing object held in a user's hand within the image;
inserting a computer-generated auxiliary pointer direction indicator different than the computer-generated gaze direction indicator into the image visible to the user, the computer-generated auxiliary pointer direction indicator a representation of the auxiliary pointer direction into the field of view, the computer-generated auxiliary pointer direction indicator intersecting the computer-generated gaze direction indicator over a first object in the image visible to the user; and
selecting the first object in the image over which the computer-generated auxiliary pointer direction indicator and the computer-generated gaze direction indicator intersect.

16. The computer program product of claim 15, wherein the computer-generated gaze direction indicator is displayed on a transparent display screen positioned between the user and the objects.

17. The computer program product of claim 15, wherein the auxiliary pointer is a compass-enabled mobile device held by the user, and wherein the determining the auxiliary pointer direction of the auxiliary pointer into the field of view comprises receiving orientation data from the compass-enabled mobile device.

* * * * *